(12) United States Patent
Millsap et al.

(10) Patent No.: US 12,097,918 B2
(45) Date of Patent: Sep. 24, 2024

(54) HANDS-OFF SIGNATURE DETECTION

(71) Applicants: Steering Solutions IP Holding Corporation, Auburn Hills, MI (US); Continental Automotive Systems, Inc., Auburn Hills, MI (US)

(72) Inventors: Scott A Millsap, Grand Blanc, MI (US); Gustavo M. Nunes, Midland, MI (US); Omkar Karve, Farmington Hills, MI (US); Joseph A LaBarbera, Auburn Hills, MI (US); Michael S. Wyciechowski, Grand Blanc, MI (US)

(73) Assignees: Steering Solutions IP Holding Corporation, Auburn Hills, MI (US); Continental Automotive Systems Inc., Auburn Hills, MI (US)

( * ) Notice: Subject to any disclaimer, the term of this patent is extended or adjusted under 35 U.S.C. 154(b) by 240 days.

(21) Appl. No.: 17/696,335

(22) Filed: Mar. 16, 2022

(65) Prior Publication Data
US 2023/0294762 A1    Sep. 21, 2023

(51) Int. Cl.
*B62D 6/10* (2006.01)
*B62D 5/04* (2006.01)

(52) U.S. Cl.
CPC ............. *B62D 6/10* (2013.01); *B62D 5/0481* (2013.01)

(58) Field of Classification Search
CPC ...... B62D 6/10; B62D 5/0481; B62D 15/025; B60W 40/08
USPC ......................................................... 701/41
See application file for complete search history.

(56) References Cited

U.S. PATENT DOCUMENTS

| | | | |
|---|---|---|---|
| 8,880,287 B2 * | 11/2014 | Lee | B62D 5/0481 701/34.4 |
| 10,046,743 B2 | 8/2018 | Jonasson et al. | |
| 10,046,749 B2 | 8/2018 | Jonasson et al. | |
| 10,139,298 B2 | 11/2018 | Kim et al. | |
| 2010/0228417 A1 * | 9/2010 | Lee | B62D 15/025 701/23 |

FOREIGN PATENT DOCUMENTS

| | | |
|---|---|---|
| DE | 102010010028 A1 | 11/2010 |
| DE | 102011106900 A1 | 1/2013 |
| DE | 102013209459 A1 | 11/2013 |
| DE | 102013211052 B3 | 12/2014 |
| DE | 102015007740 A1 | 12/2016 |
| DE | 102017211545 A1 | 6/2018 |

OTHER PUBLICATIONS

German Office Action dated Nov. 22, 2022; Application No. 10 2022 108 322.5; Applicant: Continental Automotive Systems, Inc. et al; 12 pages.
DE Office action dated Jan. 23, 2024 for DE application No. 10 2022 108 322.5.
DE Office action dated May 29, 2024 for DE application No. 10 2022 108 322.5.

* cited by examiner

*Primary Examiner* — Hai H Huynh
(74) *Attorney, Agent, or Firm* — Lorenz & Kopf LLP

(57) ABSTRACT

A system and method of hands-off signature detection may include applying a unique sinusoidal motor command to an EPS or handwheel actuator of a vehicle and monitoring attenuation of the unique sinusoidal motor command to determine if a user's hands are on or off of a handwheel of a vehicle. Attenuation of the unique sinusoidal motor command may occur due to the physical presence of a driver's hand(s) on the steering wheel.

15 Claims, 3 Drawing Sheets

HANDS-OFF SIGNATURE DETECTION

TECHNICAL FIELD

The field to which the disclosure generally relates includes the detection of user hands-on and user hands-off of vehicle steering wheels.

BACKGROUND

Vehicles equipped with advanced driver assistance systems (ADAS) may implement "hands-off" detection to determine when a driver has their hands off the steering wheel of a vehicle. ADAS may integrate with hands-off technology to better implement autonomous features or provide notifications to drivers in situations where the ADAS has determined driver control is required.

User hands-off technology may include capacitive touch sensing embedded in the steering wheel of a vehicle. The capacitive sensor may detect changes in user hands-on and user hands-off status of the steering wheel. Vehicles equipped with ADAS that require notification of the status of the driver's hands on the wheel may utilize capacitive detection of user hands-off and driver attentiveness to the driving task to determine hands-off status. Integrating this technology into vehicles may add to vehicle cost and complexity.

Current methods of detecting hands-off of a steering wheel may utilize measuring steering wheel torque and an estimation of the torque at the steering wheel. However, there are conditions where this method is not as robust as desired. Examples may include repeatedly crossing through zero steering wheel torque for too long causing false detection of hands off, or in instances where the driver removes their hands from the steering wheel but the time duration the current method uses to trigger a transition back to autonomous driving is too long and lateral deviation from the intended driving path becomes too large.

SUMMARY OF ILLUSTRATIVE VARIATIONS

Vehicle's implementing autonomous driving systems vehicle may have an electronic power steering system (EPS) that allows a driver to change the vehicle's direction or divert it from a path that it may be traveling in. The EPS may be in operable communication with the autonomous driving system, and various other systems, such that the vehicle may steer itself toward a predetermined location that has been communicated to it without assistance or interference from a driver. In some instances, the driver may take control of the driver-side steering system controls and assist the autonomous steering system or take control of the vehicle entirely, disengaging the autonomous driving system. The steering system and autonomous driving systems may be constructed and arranged to monitor whether a driver's hands are on the steering wheel such that the autonomous driving system may compensate for little or no driver interference or provide an alert or notification to a driver that hands-on attentiveness is required by the driver and the driver should take control of the vehicle.

A system and method of hands-off signature detection may include applying a low amplitude, high frequency sinusoidal motor command to an EPS or handwheel actuator of a vehicle and monitoring attenuation of the low amplitude, high frequency sinusoidal motor command to determine if a user's hands are on or off of a handwheel of a vehicle. Attenuation of the low amplitude, high frequency sinusoidal motor command may occur due to the physical presence of a driver's hand(s) on the steering wheel.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
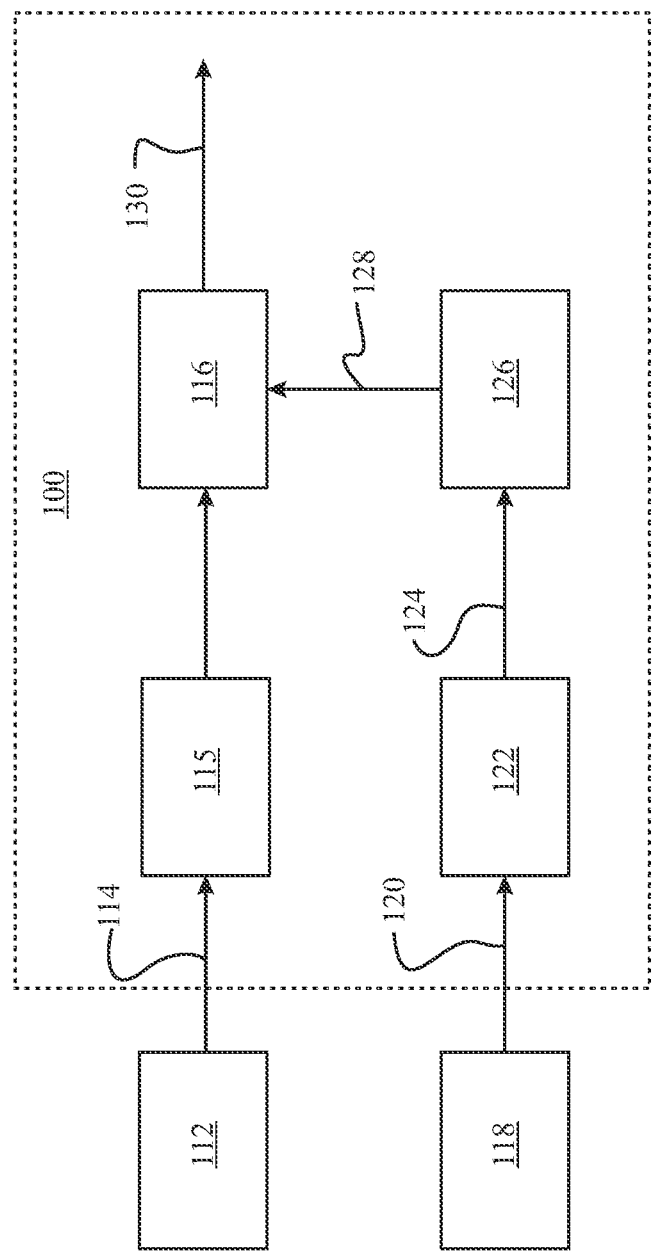
FIG. 1 depicts a diagram of a system for hands-off signature detection.

The following description of the variations is merely illustrative in nature and is in no way intended to limit the scope of the invention, its application, or uses.

As used herein, "autonomous" and variations on that term may generally refer to various levels of autonomy within vehicles including, but not limited to, recognized levels of driving automation such as those recognized by the Society of Automotive Engineers under the trademark SAE INTERNATIONAL™, the U.S. Department of Transportation, or other similar bodies.

As used herein, "wheels" or "wheel," even when modified by a descriptive adjective such as but not limited to in the recitation of "steerable roadwheels," "steerable wheels," "road wheels," or "driven wheels," may refer to a traditional road wheel and tire arrangement, but may also refer to any modification to the traditional road wheel and tire arrangement such as but not limited to rimless mag-lev tires, ball tires, or any other known means of automotive movement wherein the wheel or wheels are in at least partial contact with a road surface.

As used herein, "road," even when modified by a descriptive adjective may refer to a traditional driving surface road such as but not limited to a concrete or asphalt road but may also refer to any driving surface or medium along which or through which a vehicle for cargo or passengers may travel such as but not limited to water, ice, snow, dirt, mud, air or other gases, or space in general.

As used herein, the terms "hands-off" or "hands-on" or variations on those terms may be considered to refer generally to whether a user or vehicle driver has their hands on or off of the steering wheel of a vehicle.

As used herein, "computing device" or "computer" may refer broadly to a system constructed and arranged to execute the processes and steps described in this disclosure. A computer device may include one or more processors in operable communication with memory through a system bus that couples various system components such as input/output (I/O) devices. Processors suitable for the execution of computer readable program instructions or processes may include both general and special purpose microprocessors and any one or more processors of any digital computing device. A computing device may include standalone computer or mobile computing device, a smart device, a mainframe computer system, a workstation, a network computer, a desktop computer, a laptop, or the like. A computing device maybe a combination of components including a processor, memory, data storage, and the like in operable communication with a variety of systems within a vehicle such as, but not limited to, electronic steering systems, traction control systems, autonomous and semi-autonomous driving systems, or the like.

In a number of illustrative variations, a vehicle may have an EPS that allows a driver to change the vehicle's direction or divert it from a path that it may be traveling in. This steering system may operate in conjunction with a source of driven automotive vehicle movement such as a pair of driven road wheels. As a non-limiting example, a vehicle may be equipped with an internal combustion engine that mechanically drives a pair of rear road wheels to propel the vehicle forward along a road. In such an example, the vehicle may additionally be equipped with a set of steerable road wheels that may be manipulated by the steering system via a steering interface such as but not limited to a hand wheel to steer the vehicle to the left and to the right as the vehicle travels down the road. In such an example, the driven rear road wheels serve as the means of driven automotive vehicle movement, and the steerable pair of front road wheels as manipulated by the steering interface serves as the steering system. Additionally, it is contemplated that the means of driven automotive vehicle movement, such as but not limited to driven road wheels, and the steering means, such as but not limited to steerable road wheels, may change function or oscillate in function while in operation. As a non-limiting example, a vehicle comprising a pair of driven road wheels near the rear of the vehicle and further comprising a pair of steerable road wheels near the front of the vehicle may change driving modes and begin to utilize every road wheel available, including the front steerable road wheels, as driven road wheels while still maintaining the steerable property and steering function of the front steerable road wheels. It is similarly contemplated that driven road wheels may be intermittently or optionally used as steerable road wheels in some cases.

In a number of illustrative variations, a vehicle may comprise a steering system comprising a steering interface, and a set of steerable road wheels. The steering system may be of the steer-by-wire type wherein physical mechanisms do not mechanically communicate a manipulation of the steering interface to the steerable road wheels and wherein a manipulation of the steering interface affects an associated manipulation of the steerable road wheels via the communication of electronic devices such as but not limited to sensors, transceivers, and electronically excited actuators. In a number of illustrative variations, the steering input may include any component that a user or drive my use to steer the vehicle with a portion of the user's or driver's body, which may include at least one hand and/or at least one foot.

In a number of illustrative variations, a vehicle's steering system may also be autonomous in that the vehicle may steer itself toward a predetermined location that has been communicated to it without assistance or interference from a driver. The autonomous driving system may include at least one computing devices or a plurality of various computing devices in operable communication with one another and various systems within the vehicle. In some instances, the driver may take control of the driver-side steering system controls and assist the autonomous steering system. The steering system and autonomous driving systems may be constructed and arranged to monitor whether a driver's hands are on the steering wheel such that the autonomous driving system may compensate for little or no driver interference or provide an alert or notification to a driver that hands-on attentiveness is required by the driver. In some instances, the vehicle may include audio or visual cues or signals constructed and arranged to alert a driver that hands-on control is required.

The vehicle's steering system may include a system and method of hands-off signature detection within a vehicle. The system may include determining if an autonomous driving mode is active, and if so, may include applying a low amplitude, high frequency sinusoidal motor command to an EPS or handwheel actuator of a vehicle. The system may include monitoring attenuation of the low amplitude, high frequency sinusoidal motor command to determine if a user's hands are on or off a handwheel of a vehicle by detecting a signal change in the torque signal specifically in the range of the low amplitude, high frequency sinusoidal motor command. The low amplitude, high frequency sinusoidal motor command may be about 30 Hz to about 50 Hz. According to some embodiments, the low amplitude, high frequency sinusoidal motor command may be about 20 Hz to about 60 Hz. According to some embodiments, the low amplitude, high frequency sinusoidal motor command may be about 5 Hz to about 75 Hz.

Autonomous cooperative torque modes may include functionality allowing a driver to provide steering input while a vehicle is in an autonomous mode, the steering input augmenting the autonomous driving trajectory at the driver's request. A low amplitude, high frequency sinusoidal motor command or signature may be applied and monitored via a handwheel torque sensor for a signature change in the torque signal specifically in the range of the sinusoid frequency when hands are on or off the steering wheel. The sinusoidal signature may be present in EPS motor command when both autonomous position servo command and autonomous cooperative torque modes are active. Autonomous position servo commands may be active during hands off autonomous driving and may function as an EPS motor command resulting from a closed loop position control. The system of hands-off signature detection may generate a flag based on changes in the torque signal and may be combined logically with the existing hands-off detection criteria.

The system and method of hands-off signature detection may apply a low amplitude, high frequency sinusoidal motor command to generate a sinusoid frequency in monitored handwheel torque. Monitored handwheel torque may be filtered to isolate the generated sinusoid frequency which may be compared to a predetermined threshold to determine if a driver's hands are off the handwheel based on attenuation of the generated sinusoid frequency. In some variations, hands-off detection may be determined where driver estimated torque is below a predetermined threshold and handwheel torque signature is above a predetermined threshold for a predetermined duration. The system of hands-off signature detection may generate a flag based on changes in the torque signal and may be combined logically with the existing hands-off detection criteria.

According to some variations, the system may filter monitored handwheel torque to isolate the low amplitude, high frequency command by any suitable filtering means, such as, but not limited to, a peaking or bell filter. The filter may amplify or attenuate the magnitude of a specific frequency or range of frequencies. In this way, the low amplitude, high frequency command may be specifically targeted for monitoring to determine that a user's hands are off a steering wheel.

The system may determine that a user's hands are off a steering wheel where monitored driver estimated torque is below a predetermined threshold. Driver estimated torque may include a signal within an EPS steering wheel that is representative of driver hand torque at the steering wheel. The system may also determine that a user's hands are off a steering wheel when a motor oscillation signature in a torque sensor is above a predetermined threshold approximating that a drivers' hands are not physically attenuating the applied low amplitude, high frequency command. The system may estimate that driver hands are not on the steering wheel monitored driver estimated torque is below a predetermined threshold and the motor oscillation signature in a torque sensor is above the predetermined threshold for a predetermined duration of time.

The system may generate a flag indicating that a driver's hands are off the steering wheel and the system may provide visual or audio cues to a driver indicating that hands on the steering wheel may be necessary. The flag may be combined logically with the existing hands-off detection criteria and systems.

Referring to FIG. 1 depicts a diagram of a system 100 including receiving driver estimated torque 114 from a driver estimated torque calculation software component 112 and handwheel torque 120 from torque sensor 118. A unique sinusoidal command, such as a low amplitude, high frequency command, may be applied to the EPS or handwheel actuator. Handwheel torque 120 may be filtered 122 to isolate the applied low amplitude, high frequency command and generate a handwheel torque signature 124. The handwheel torque signature 124 may undergo a threshold check 126 to determine if the handwheel torque signature 124 is above a first predetermined threshold. Where the handwheel torque signature 124 is above a first predetermined threshold a handwheel signature flag 128 may be generated and communicated to a hands-off detection logic module 116. The driver estimated torque 114 may also be communicated to the hands-off detection logic module 116. According to some embodiments, an additional check 115 may be performed to determine if driver estimated torque is below a second predetermined threshold. Where driver estimated torque is below a second predetermined threshold and the hands-off detection logic module 116 has received a handwheel signature flag 128, the system 100 may determine that driver hands off has been detected 130. Hands off detection 130 may be combined logically with the existing hands-off detection criteria and systems within the vehicle.

Figure 2:
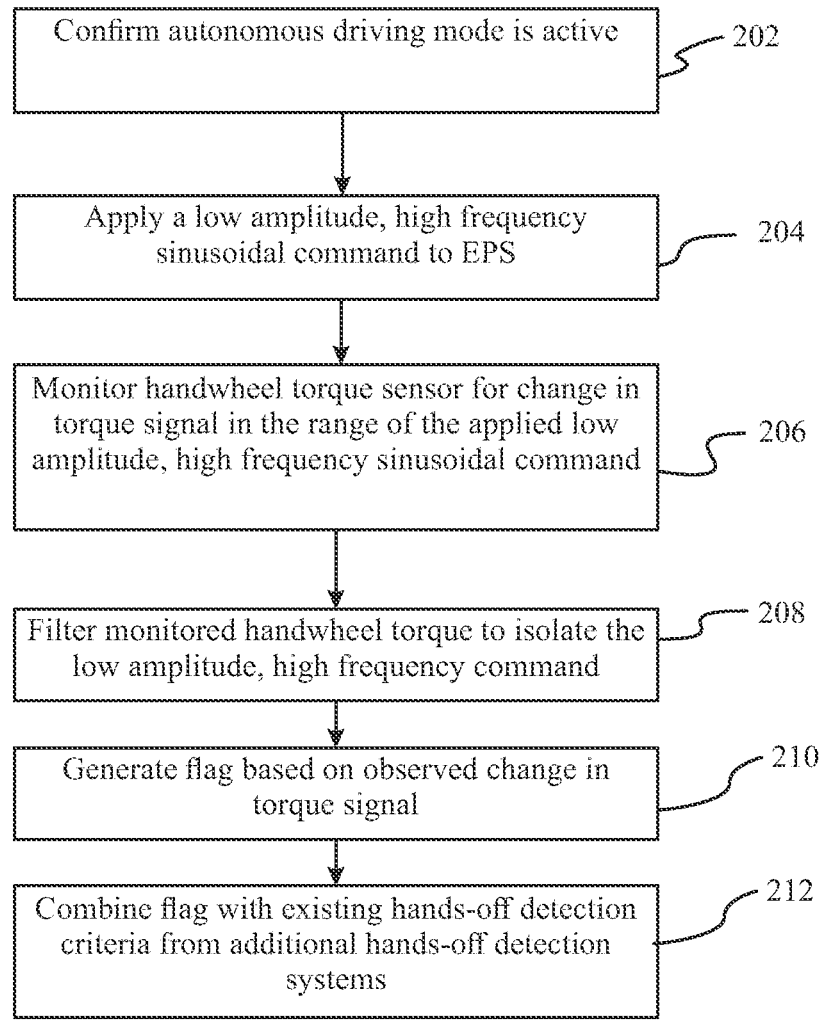
FIG. 2 depicts a block diagram of a system for hands-off signature detection.

FIG. 2 depicts a block diagram of one example of a system for hands-off signature detection including, in a first block 202, determining if an autonomous driving mode is active within a vehicle. If the autonomous driving mode is active, the system may, in a second block 204, apply a low amplitude, high frequency sinusoidal command to an electronic power steering system. According to block 206, the system may monitor a torque signal via a handwheel torque sensor for change in the torque signal within the range of the applied a low amplitude, high frequency sinusoidal command. According to block 208, the system may filter the monitored handwheel torque signal such that the low amplitude, high frequency sinusoidal command may be isolated. According to block 210, the system may generate a flag based on an observed change in the isolated torque signal and, according to block 212, combine the flag with existing hands-off detection criteria within the system.

Figure 3:
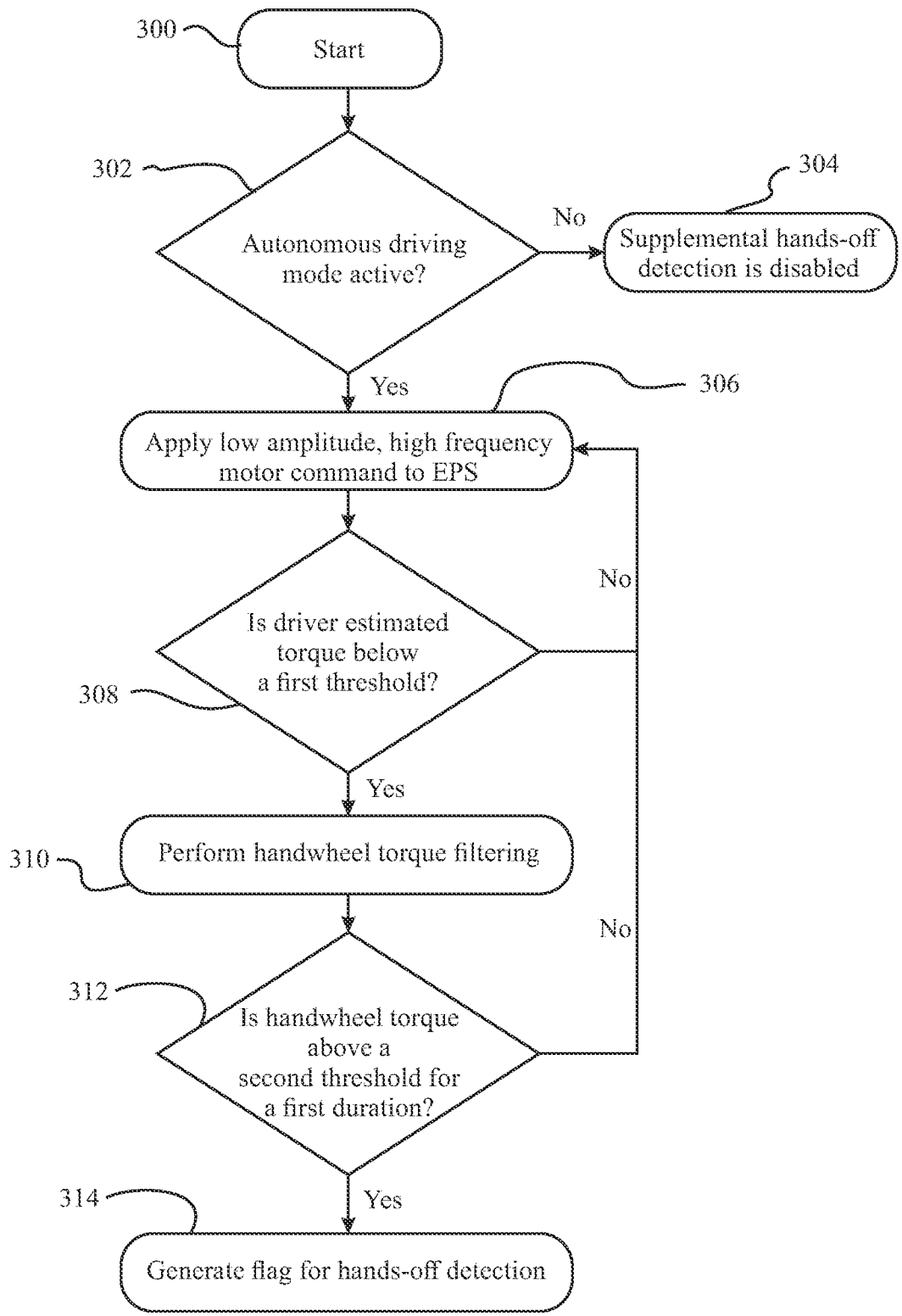
FIG. 3 depicts a flowchart of a system for hands-off signature detection.

FIG. 3 depicts a flowchart of one example of a system for hands-off signature detection including starting 300 by determining if an autonomous driving mode is active 302 in a vehicle. If autonomous driving mode is inactive, the system may disable supplemental hands-off detection 304. If an autonomous driving mode is active, the system may apply and monitor a low amplitude, high frequency sinusoidal command to an electronic power steering system 306. The system may determine if driver estimated torque is below a first predetermined threshold 308. If driver estimated torque is not below a first predetermined threshold, the system may continue to apply and monitor a low amplitude, high frequency sinusoidal command to an electronic power steering system 306. If driver estimated torque is below a first predetermined threshold 308, the system may perform handwheel torque filtering to isolate the low amplitude, high frequency command and generate a handwheel torque signature. According to block 310, the handwheel torque signature may undergo a threshold check to determine if the handwheel torque signature is above a predetermined threshold. If the handwheel torque signature is below a predetermined threshold, the system may continue to apply and monitor a low amplitude, high frequency sinusoidal command to an electronic power steering system 306. Where the handwheel torque signature is above a first predetermined threshold for a predetermined duration, a handwheel signature flag may be generated 312 and communicated to a hands-off detection logic module.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

According to variation 1, a method may include implementing an autonomous steering system may including an electronic power steering system may including a steering interface manipulation device; determining that an autonomous driving mode is active; analyzing a handwheel torque signal in the electronic power steering system; applying a low amplitude, high frequency sinusoidal motor command to at least a portion of the electronic power steering system; analyzing attenuation of the low amplitude, high frequency sinusoidal command; filtering the analyzed handwheel torque signal such that the low amplitude, high frequency sinusoidal command is isolated; and detecting a signal change in the handwheel torque signal in the range of the low amplitude, high frequency sinusoidal motor command adapted to determine that a user's hands are off the steering interface manipulation device.

Variation 2 may include a method as in variation 1 wherein the low amplitude, high frequency sinusoidal motor command ranges from about 30 Hz to about 50 Hz. According to some embodiments, the low amplitude, high frequency sinusoidal motor command may be about 20 Hz to about 60 Hz. According to some embodiments, the low amplitude, high frequency sinusoidal motor command may be about 5 Hz to about 75 Hz.

Variation 3 may include a method as in any of variations 1 through 2 wherein the steering interface manipulation device is a steering wheel.

Variation 4 may include a method as in any of variations 1 through 3 wherein detecting a signal change in the torque signal in the range of the low amplitude, high frequency sinusoidal motor command to determine that a user's hands are off the steering interface manipulation device may include detecting attenuation of the low amplitude, high frequency sinusoidal motor command.

Variation 5 may include a method as in any of variations 1 through 4 further may include generating a hands-off flag indicating hands-off status.

Variation 6 may include a method as in any of variations 1 through 5 further may include combining the hands-off flag with existing hands-off detection criteria within the system to supplement hands-off detection.

Variation 7 may include a method as in any of variations 1 through 6 wherein detecting a signal change in the handwheel torque signal in the range of the low amplitude, high frequency sinusoidal motor command may include determining that driver estimated torque is below a first predetermined threshold and determining that the filtered handwheel torque signature is above a second predetermined threshold for a first duration.

Variation 8 may include a method as in any of variations 1 through 7 wherein applying a low amplitude, high frequency sinusoidal motor command to at least a portion of the electronic power steering system may include applying and monitoring the low amplitude, high frequency sinusoidal command to a handwheel actuator.

According to variation 9, a method of hands-off signature detection may include determining that an autonomous driving mode is active within a vehicle; receiving hands-off detection criteria from a primary hands-off detection system; applying a unique sinusoidal command to an electronic power steering system within the vehicle; monitoring a torque signal via a handwheel torque sensor for change in the torque signal within the range of the applied unique sinusoidal command; filtering the monitored handwheel torque signal such that the unique sinusoidal command is isolated; generating a flag based on an observed change in the isolated torque signal; and combining the flag with the hands-off detection criteria from the primary hands-off detection system to supplement the primary hands-off detection system.

Variation 10 may include a method of hands-off signature detection as in variation 9 wherein the unique sinusoidal command is a low amplitude, high frequency sinusoidal motor command.

Variation 11 may include a method of hands-off signature detection as in any of variations 9 through 10 wherein the low amplitude, high frequency sinusoidal motor command ranges from about 30 Hz to about 50 Hz.

Variation 12 may include a method of hands-off signature detection as in any of variations 9 through 11 wherein applying a unique sinusoidal command to an electronic power steering system within the vehicle may include applying the unique sinusoidal command to a steering interface manipulation device may including a steering wheel.

Variation 13 may include a method of hands-off signature detection as in any of variations 9 through 12 wherein monitoring a torque signal via a handwheel torque sensor for change in the torque signal within the range of the applied unique sinusoidal command may include monitoring attenuation of the unique sinusoidal command attributable to the physical presence of a driver's hand on the steering wheel.

Variation 14 may include a method of hands-off signature detection as in any of variations 9 through 13 wherein the hands-off detection criteria of the primary hands-off detection system may include determining driver estimated torque below a third threshold for a second duration.

Variation 15 may include a method of hands-off signature detection as in any of variations 9 through 14 wherein applying a unique sinusoidal command to an electronic power steering system within the vehicle may include applying and monitoring the unique sinusoidal command to a handwheel actuator.

According to variation 16, a method of supplementing a system for hands-off signature detection may include determining that an autonomous driving mode is active within a vehicle; determining that driver estimated torque is below a first predetermined threshold; applying and monitoring a low amplitude, high frequency sinusoidal command to an electronic power steering system; performing handwheel torque filtering to isolate the low amplitude, high frequency command; generating a filtered handwheel torque signature; determining that the filtered handwheel torque signature is above a second predetermined threshold for a first duration; generating a handwheel signature flag; and communicating the handwheel signature flag to a hands-off detection logic module.

Variation 17 may include a method of supplementing a system for hands-off signature detection as in variation 16, further may including combining the handwheel signature flag with hands-off detection criteria of a primary hands-off detection system.

Variation 18 may include a method of supplementing a system for hands-off signature detection as in any of variations 16 through 17, wherein the hands-off detection criteria of the primary hands-off detection system may include determining driver estimated torque below a third threshold for a second duration.

Variation 19 may include a method of supplementing a system for hands-off signature detection as in any of variations 16 through 18, wherein the low amplitude, high frequency sinusoidal motor command ranges from about 30 Hz to about 50 Hz.

Variation 20 may include a method of supplementing a system for hands-off signature detection as in any of variations 16 through 19 wherein applying and monitoring a low amplitude, high frequency sinusoidal command to an electronic power steering system may include applying and monitoring the low amplitude, high frequency sinusoidal command to a handwheel actuator.

The above description of select variations within the scope of the invention is merely illustrative in nature and, thus, variations or variants thereof are not to be regarded as a departure from the spirit and scope of the invention.

What is claimed is:

1. A method comprising:
   implementing an autonomous steering system comprising an electronic power steering system comprising a steer-by-wire handwheel actuator;
   determining that an autonomous driving mode is active;
   analyzing a handwheel torque signal in the electronic power steering system;
   applying a low amplitude, high frequency sinusoidal motor command to at least the handwheel actuator;
   analyzing attenuation of the low amplitude, high frequency sinusoidal command;
   filtering the analyzed handwheel torque signal such that the low amplitude, high frequency sinusoidal command is isolated; and
   detecting a signal change in the handwheel torque signal in the range of the low amplitude, high frequency sinusoidal motor command adapted to determine that a user's hands are off the handwheel.

2. The method as in claim 1, wherein the low amplitude, high frequency sinusoidal motor command ranges from about 30 Hz to about 50 Hz.

3. The method as in claim 1, wherein detecting a signal change in the torque signal in the range of the low amplitude, high frequency sinusoidal motor command adapted to determine that a user's hands are off the handwheel comprises detecting attenuation of the low amplitude, high frequency sinusoidal motor command.

4. The method as in claim 1, further comprising generating a hands-off flag indicating hands-off status.

5. The method as in claim 4, further comprising combining the hands-off flag with at least one existing hands-off detection criteria to supplement hands-off detection.

6. The method as in claim 1, wherein detecting a signal change in the handwheel torque signal in the range of the low amplitude, high frequency sinusoidal motor command comprises:
   determining that a driver estimated torque is below a first predetermined threshold; and
   determining that the filtered handwheel torque signature is above a second predetermined threshold for a first duration.

7. A method of hands-off signature detection comprising:
   determining that an autonomous driving mode is active within a vehicle;
   receiving hands-off detection criteria from a primary hands-off detection system;
   applying and monitoring a low amplitude, high frequency sinusoidal command to a handwheel actuator of a steer-by-wire steering system within the vehicle;
   monitoring a torque signal via a handwheel torque sensor for change in the torque signal within the range of the applied unique sinusoidal command;
   filtering the monitored handwheel torque signal such that the unique sinusoidal command is isolated;
   generating a flag based on an observed change in the isolated torque signal; and
   combining the flag with the hands-off detection criteria from the primary hands-off detection system to supplement the primary hands-off detection system.

8. The method of hands-off signature detection as in claim 7 wherein the unique sinusoidal command is a low amplitude, high frequency sinusoidal motor command.

9. The method of hands-off signature detection as in claim 8 wherein the low amplitude, high frequency sinusoidal motor command ranges from about 30 Hz to about 50 Hz.

10. The method of hands-off signature detection as in claim 7 wherein monitoring a torque signal via a handwheel torque sensor for change in the torque signal within the range of the applied unique sinusoidal command comprises monitoring attenuation of the unique sinusoidal command attributable to the physical presence of a driver's hand on the steering wheel.

11. The method of hands-off signature detection as in claim 10, wherein the hands-off detection criteria of the primary hands-off detection system comprises determining driver estimated torque below a third threshold for a second duration.

12. A method of supplementing a system for hands-off signature detection comprising:
   determining that an autonomous driving mode is active within a vehicle;
   applying and monitoring a low amplitude, high frequency sinusoidal command to a handwheel actuator of a steer-by-wire steering system;
   determining that driver estimated torque is below a first predetermined threshold;
   performing handwheel torque filtering to isolate the low amplitude, high frequency command;
   generating a filtered handwheel torque signature;
   determining that the filtered handwheel torque signature is above a second predetermined threshold for a first duration; and
   generating a handwheel signature flag; and
   communicating the handwheel signature flag to a hands-off detection logic module.

13. A method of supplementing a system for hands-off signature detection as in claim 12, further comprising combining the handwheel signature flag with at least one hands-off detection criteria of a primary hands-off detection system.

14. A method of supplementing a system for hands-off signature detection as in claim 13, wherein the at least one hands-off detection criteria of the primary hands-off detection system comprises determining driver estimated torque below a third threshold for a second duration.

15. A method of supplementing a system for hands-off signature detection as in claim 12, wherein the low amplitude, high frequency sinusoidal motor command ranges from about 30 Hz to about 50 Hz.

* * * * *